US009989087B2

(12) United States Patent
Bacher et al.

(10) Patent No.: US 9,989,087 B2
(45) Date of Patent: Jun. 5, 2018

(54) CABLE TRANSPORTATION SYSTEM WITH AT LEAST ONE HAUL CABLE

(71) Applicant: Leitner S.P.A., Vipiteno (IT)

(72) Inventors: Christian Bacher, Gossensass (IT); Nikolaus Erharter, San Candido (IT)

(73) Assignee: Leitner S.P.A., Vipiteno (IT)

( * ) Notice: Subject to any disclaimer, the term of this patent is extended or adjusted under 35 U.S.C. 154(b) by 0 days. days.

(21) Appl. No.: 15/197,096

(22) Filed: Jun. 29, 2016

(65) Prior Publication Data
US 2016/0312824 A1    Oct. 27, 2016

Related U.S. Application Data

(63) Continuation of application No. 13/993,996, filed as application No. PCT/IB2011/055717 on Dec. 15, 2011, now Pat. No. 9,387,862.

(30) Foreign Application Priority Data

Dec. 15, 2010 (IT) .............................. MI2010A2302

(51) Int. Cl.
F16C 35/073    (2006.01)
B61B 12/10    (2006.01)
(Continued)

(52) U.S. Cl.
CPC ................ F16C 21/00 (2013.01); B61B 7/02 (2013.01); B61B 12/06 (2013.01); B61B 12/10 (2013.01);
(Continued)

(58) Field of Classification Search
CPC .......... F16C 39/02; F16C 19/52; F16C 21/00; F16C 35/073; B61B 12/10
(Continued)

(56) References Cited

U.S. PATENT DOCUMENTS 3,452,349 A    6/1969  Wood
3,603,654 A    9/1971  Bird
(Continued)

FOREIGN PATENT DOCUMENTS

CN    101837783       9/2010
DE    25 12 966 A1    9/1976
(Continued)

OTHER PUBLICATIONS

International Search Report and Written Opinion for International Application No. PCT/IB2011/055717 dated Mar. 14, 2012.
(Continued)

Primary Examiner — Mark T Le
(74) Attorney, Agent, or Firm — Neal, Gerber & Eisenberg LLP

(57) ABSTRACT

A cable transportation system with at least one haul cable has a supporting structure with a tubular portion defining an axis of rotation; a pulley extending about the axis of rotation; and a bearing assembly, which is connected to the pulley and the tubular portion to enable the pulley to rotate about the axis of rotation with respect to the supporting structure, and has a first and second bearing arranged concentrically and in series, so as to ensure rotation of the pulley about the axis of rotation and with respect to the supporting structure utilizing at least the first or second bearing.

18 Claims, 4 Drawing Sheets

(51) Int. Cl.
  *F16C 21/00* (2006.01)
  *B61B 12/06* (2006.01)
  *F16C 19/52* (2006.01)
  *F16C 39/02* (2006.01)
  *B61B 7/02* (2006.01)
  *B61B 12/12* (2006.01)
  *F16C 23/08* (2006.01)

(52) U.S. Cl.
  CPC .............. *B61B 12/12* (2013.01); *F16C 19/52* (2013.01); *F16C 35/073* (2013.01); *F16C 39/02* (2013.01); *F16C 23/086* (2013.01)

(58) Field of Classification Search
  USPC ......................................................... 104/178
  See application file for complete search history.

(56) References Cited

U.S. PATENT DOCUMENTS

| | | | |
|---|---|---|---|
| 4,058,353 | A | 11/1977 | Frommlet et al. |
| 4,492,416 | A | 1/1985 | Kaufmann |
| 4,664,539 | A | 5/1987 | Li |
| 5,322,373 | A | 6/1994 | Oakes et al. |
| 5,616,976 | A | 4/1997 | Fremerey et al. |
| 7,036,435 | B2 | 5/2006 | Morand et al. |
| 2003/0123767 | A1 | 7/2003 | Fite et al. |

FOREIGN PATENT DOCUMENTS

| | | |
|---|---|---|
| DE | 2512966 | 9/1976 |
| FR | 2665131 | 1/1992 |
| GB | 1463486 | 2/1977 |

OTHER PUBLICATIONS

Notification Concerning Submission, Obtention or Transmittal of Priority Document (Form PCT/IB/304) dated Mar. 22, 2012.
Response to International Search Report and the associated Written Opinion dated Oct. 12, 2012.
PCT Demand (Form PCT/IPEA/401).
Notification of Receipt of Demand by Competent International Preliminary Examining Authority (Form PCT/IPEA/402) dated Oct. 19, 2012.
Second Written Opinion of the International Preliminary Examining Authority dated Dec. 11, 2012.
Response to the Second Written Opinion dated Feb. 4, 2013.
Notification of Transmittal of the International Preliminary Report on Patentability (Form PCT/IPEA/416) dated Mar. 1, 2013.
International Preliminary Report on Patentability (Form PCT/IPEA/409) dated Mar. 1, 2013.
Chinese Office Action for Chinese Patent Application No. 2011800604203 dated Feb. 28, 2015 (7 pages).
Notice of Opposition with enclosed non-patent literature documents for European Patent Application No. 11813406.3 dated Aug. 10, 2015.

CABLE TRANSPORTATION SYSTEM WITH AT LEAST ONE HAUL CABLE

PRIORITY CLAIM

This application is a continuation of, claims the benefit of and priority to U.S. patent application Ser. No. 13/993,996, filed on Aug. 21, 2013, which is a national stage application of PCT/IB2011/055717, filed on Dec. 15, 2011, which claims the benefit of and priority to Italian Patent Application No. MI2010A 002302, filed on Dec. 15, 2010, the entire contents of which are each incorporated by reference herein.

BACKGROUND

French Patent No. FR 2,665,131 and German Patent No. DE 25 12 966 are each directed to known cable transportation systems.

A bearing assembly of this type of cable transportation system requires constant maintenance for the pulley to rotate smoothly, and lubrication to prevent the bearing assembly from seizing. Even with thorough care and maintenance, however, the bearing assembly may accidentally seize, thus resulting in stoppage of the entire cable transportation system. Particularly when used for passenger transport, stoppage of the system calls for emergency rescue procedures to disembark the passengers, which in some cases is extremely slow, painstaking work requiring the use of special equipment.

SUMMARY

The present disclosure relates to a cable transportation system with at least one haul cable.

More specifically, the present disclosure relates to a cable transportation system comprising a supporting structure defining an axis of rotation; a pulley extending about the axis of rotation, and having a groove configured to be engaged by the haul pulley; and a bearing assembly connected to the pulley and the supporting structure to enable the pulley to rotate about the axis of rotation with respect to the supporting structure.

It is an advantage of the present disclosure to provide a cable transportation system configured to eliminate certain of the drawbacks of known systems.

Another advantage of the present disclosure is to provide a cable transportation system configured to enable relatively easy, low-cost passenger rescue.

According to the present disclosure, there is provided a cable transportation system with at least one haul cable, the cable transportation system comprising an arrival/departure station comprising a supporting structure with a tubular portion defining an axis of rotation; a pulley extending about the axis of rotation; and a bearing assembly, which is connected to the pulley and the supporting structure to enable the pulley to rotate about the axis of rotation with respect to the supporting structure, the cable transportation system being characterized by comprising at least a first and at least a second bearing arranged concentrically and in series, so as to ensure rotation of the pulley about the axis of rotation and with respect to the supporting structure utilizing at least the first or second bearing.

A first bearing may thus be used for normal operation of the system, and a second bearing for operating the system in emergency passenger rescue situations.

In one embodiment of the cable transportation system, the bearing assembly comprises a sleeve located between the first and second bearing, and fixable selectively to the supporting structure and the pulley.

The pulley can thus be selected to rotate about the tubular portion of the supporting structure utilizing the first or second bearing. To select which of the first and second bearings is to be used, the sleeve is fixable selectively to the pulley or the supporting structure.

Fixing the sleeve to the supporting structure utilizing at least one dynamometer pin is particularly advantageous, by enabling constant monitoring of the first bearing, such as for normal operation of the cable transportation system. Moreover, the dynamometer pin is configured to break when subjected to a load exceeding a designated or given break load.

In one embodiment, the sleeve is fixable to the pulley utilizing at least one lock pin, by which to simply lock the damaged bearing quickly and easily in an emergency situation, and so prevent the damage to the bearing from getting any worse.

Additional features and advantages are described in, and will be apparent from the following Detailed Description and the figures.

BRIEF DESCRIPTION OF THE DRAWINGS

A non-limiting embodiment of the present disclosure will be described by way of example with reference to the accompanying drawings, in which.

DETAILED DESCRIPTION

Figure 1:
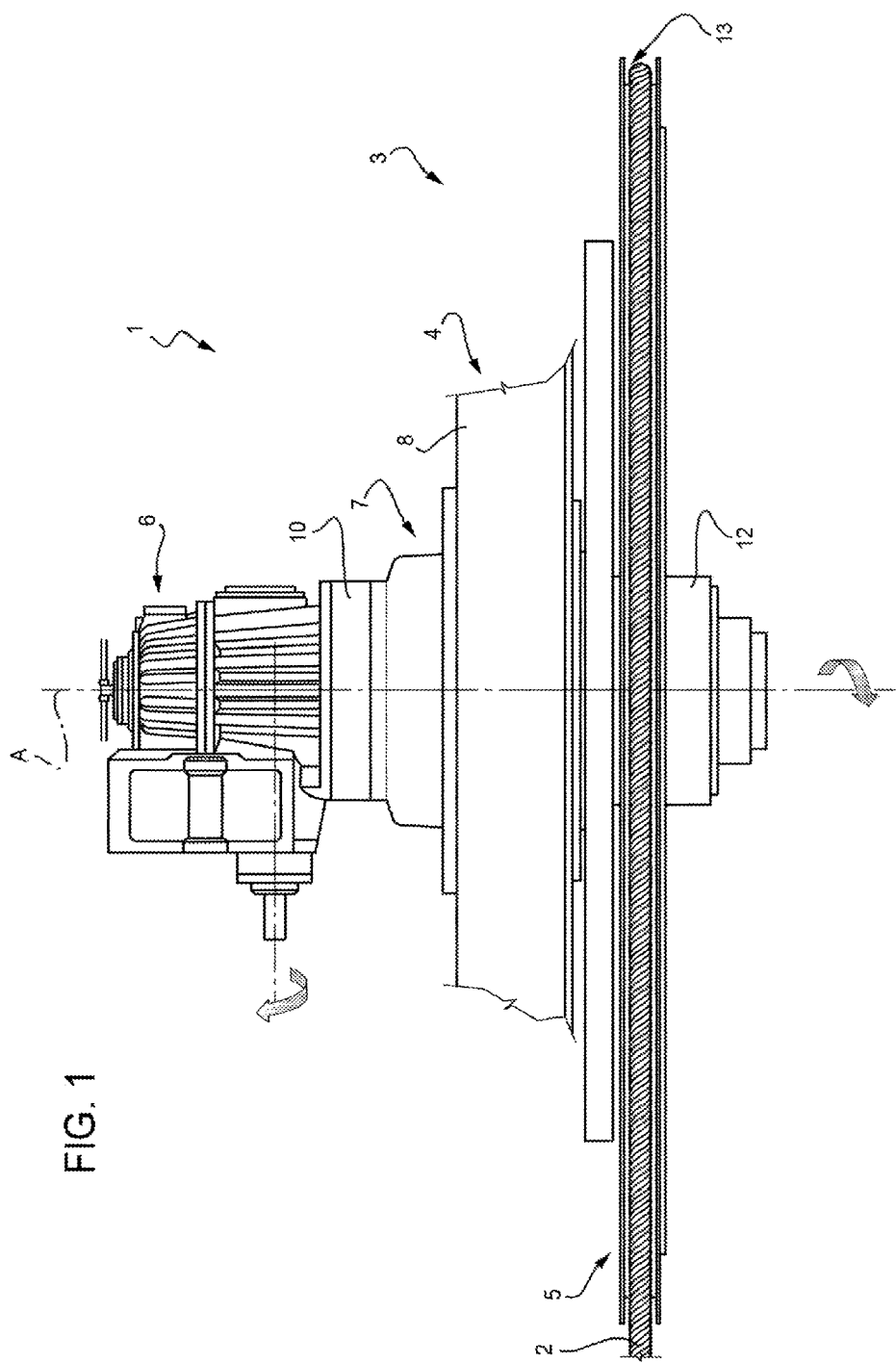
FIG. 1 shows a schematic, partly sectioned side view, with parts removed for clarity, of a cable transportation system in accordance with the present disclosure.

Referring now to the example embodiments of the present disclosure illustrated in FIGS. 1 to 4, number 1 in FIG. 1 indicates as a whole a cable transportation system comprising a haul cable 2.

In the example described, specific reference is made to a cable transportation system with one haul and support cable 2; it being understood, however, that the present disclosure also applies to transportation systems with more than one cable.

Cable transportation system 1 and haul cable 2 extend between two arrival/departure stations 3, only one of which is shown in the drawings. Arrival/departure station 3 comprises a supporting structure 4; a pulley 5, which rotates about an axis A with respect to supporting structure 4; and an electric drive member 6 connected to the pulley by a transmission 7. Supporting structure 4 comprises a frame, in turn comprising a beam 8, and a tubular portion 9 (FIG. 2) integral with beam 8. Because drive member 6 is located over beam 8, and pulley 5 is located beneath beam 8, transmission 7 extends at least partly through tubular portion 9 (FIG. 2) and, in the example shown, comprises a reduction gear 10 over beam 8; a shaft 11 (FIG. 2) housed for rotation inside tubular portion 9 (FIG. 2); and a joint 12 fitted to shaft 11 (FIG. 2) and pulley 5.

In a variation (not shown), drive member 6 and/or reduction gear 10 are/is located beneath beam 8.

Figure 2:
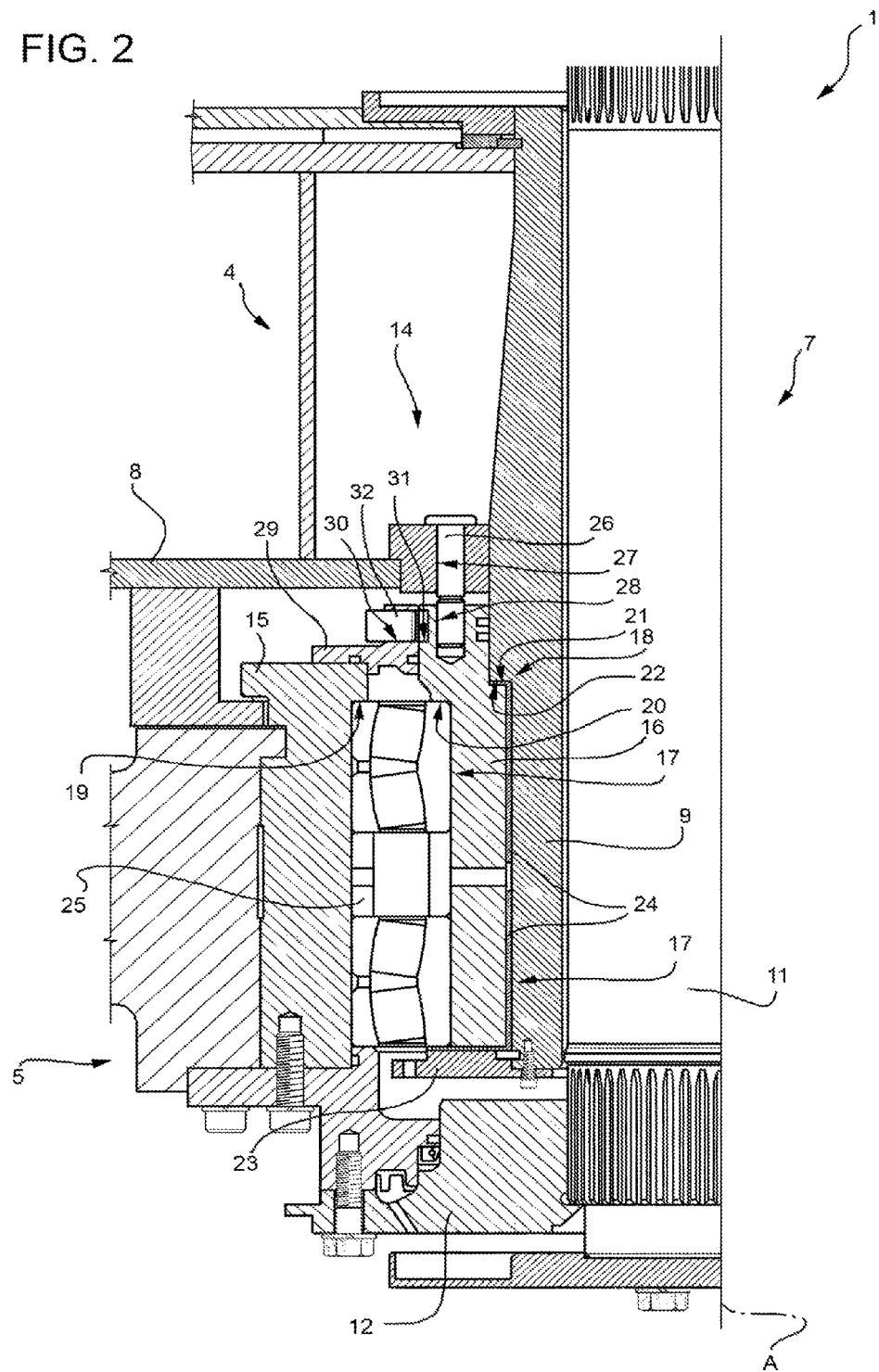
FIG. 2 shows a larger-scale section, with parts removed for clarity, of a detail of the FIG. 1 cable transportation system in a first operating configuration.

Pulley 5 comprises an outer-edge groove 13 configured to house haul cable 2, and is connected to supporting structure 4 to rotate about axis A utilizing a bearing assembly 14 (FIG. 2).

In other words, as shown in FIG. 2, shaft 11 transmitting rotation to pulley 5 extends along and rotates about axis A; tubular portion 9 extends concentrically with and about shaft 11; pulley 5 extends and rotates about axis A; and bearing assembly 14 is located between the inner edge of pulley 5 and the tubular portion 9 of supporting structure 4. In the example shown, pulley 5 comprises an inner-edge sleeve 15 configured to mount bearing assembly 14. Bearing assembly 14 comprises a sleeve 16 configured to selectively connect integrally to pulley 5 or supporting structure 4—in the example shown, to beam 8; two bearings 17; and a bearing 18. The two bearings 17 are located side by side and concentrically between pulley 5 and sleeve 16, and bearing 18 extends from sleeve 16 to tubular portion 9 of supporting structure 4. In other words, each bearing 17 is a rolling bearing mounted between pulley 5 and sleeve 16, and bearing 18 is a sliding bearing mounted between sleeve 16 and tubular portion 9. Though specific reference is made in this description to two bearings 17, this is in no way limiting: the number or quantity of bearings 17 depends on the characteristics of the forces exchanged, and of the cable transportation system, and is a design issue. Likewise, though specific reference is made in this description to one sliding bearing, this is in no way limiting, the number or quantity of sliding bearings being selected according to the characteristics of the cable transportation system.

Sleeve 15 is fitted along the inner edge of pulley 5, and has a shoulder 19 for assembling bearings 17. Sleeve 16 has a shoulder 20 for assembling bearings 17, is fitted loosely about tubular portion 9, has a shoulder 21 engaging a shoulder 22 of tubular portion 9, and is locked axially by an annular flange 23 integral with tubular portion 9. And bearing 18 comprises sliding elements 24, normally made of Teflon or similar.

In the example shown, the two rolling bearings 17 are separated by a spacer 25.

Rolling bearings 17 and sliding bearing 18 are arranged concentrically—in the example shown, with sliding bearing 18 inwards of rolling bearings 17—and permit rotation of pulley 5 about supporting structure 4—in the example shown, about axis A. In other words, the two rolling bearings 17 are arranged "parallel", and sliding bearing 18 is located "in series" with rolling bearings 17. In actual use, sliding bearing 18 is used as an emergency bearing, and is normally locked. More specifically, sleeve 16 is connected integrally to supporting structure 4 utilizing at least one dynamometer pin 26. The example shown employs two dynamometer pins 26 (only one shown in FIGS. 2 and 3), each of which engages two holes 27 and 28 parallel to axis A and formed respectively in beam 8 and in the thickness of sleeve 16, comprises two sensors (not shown) configured to detect the stress exerted on it, and is configured to break when the load exerted on it exceeds a designated or given break load.

Figure 3:
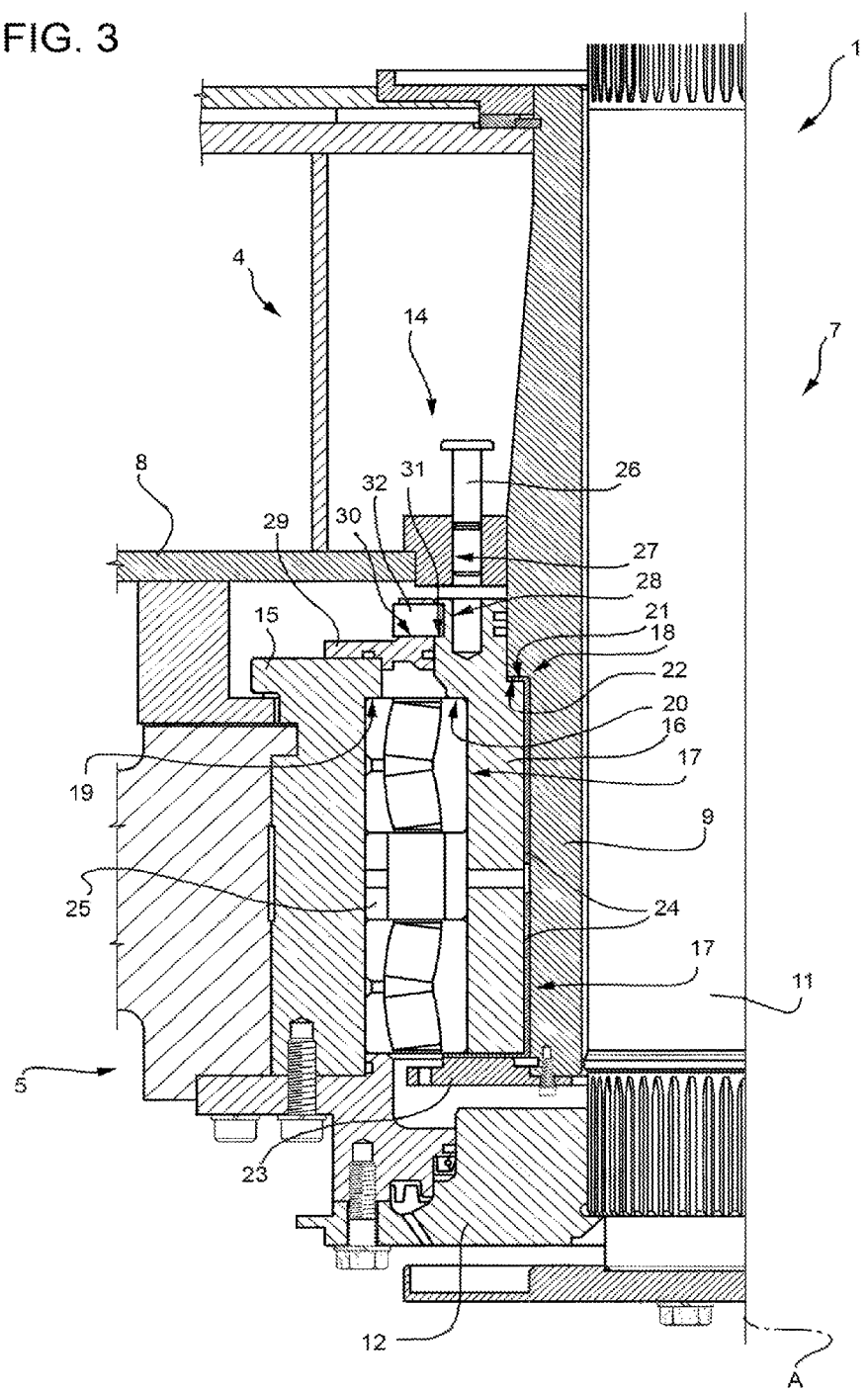
FIG. 3 shows a larger-scale section, with parts removed for clarity, of a detail of the FIG. 1 cable transportation system in a second operating configuration.

In an emergency situation (breakdown of bearings 17), sleeve 16 can be connected integrally to pulley 5 as shown more clearly in FIG. 3. With reference to FIG. 3, sleeve 15 is integral with a ring 29 having one face facing and very close to sleeve 16. Ring 29 has at least one radial hole 30, and sleeve 16 has at least one dead radial hole 31 at the same height as and selectively alignable with hole 30. In the example shown, ring 29 and sleeve 16 have two holes 30 and two holes 31 respectively; and each pair of holes 30 and 31 is selectively alignable and engageable by a pin 32 configured to integrally connect pulley 5 and sleeve 16 and so locking rolling bearings 17.

With reference to FIGS. 2 and 3, joint 12 is defined by a number or quantity of assembled parts configured to connect shaft 11 to pulley 5, and also forms a hermetic seal between shaft 11 and pulley 5, to permit oil-bath lubrication of bearings 17 and 18.

In actual use, during normal operation of cable transportation system 1, sliding bearing 18 is maintained in the locked position shown in FIG. 2. Conversely, when rolling bearings 17 show signs of malfunctioning, they are locked by inserting pins 30, and dynamometer pins 26 are removed to permit operation of sliding bearing 18, as shown in FIG. 3.

Cable transportation system 1 can thus be kept running to rescue the passengers, without causing any further damage to rolling bearings 17.

Dynamometer pins 26 also provide for constantly monitoring the efficiency, and so preventing critical operation, of rolling bearings 17.

Figure 4:
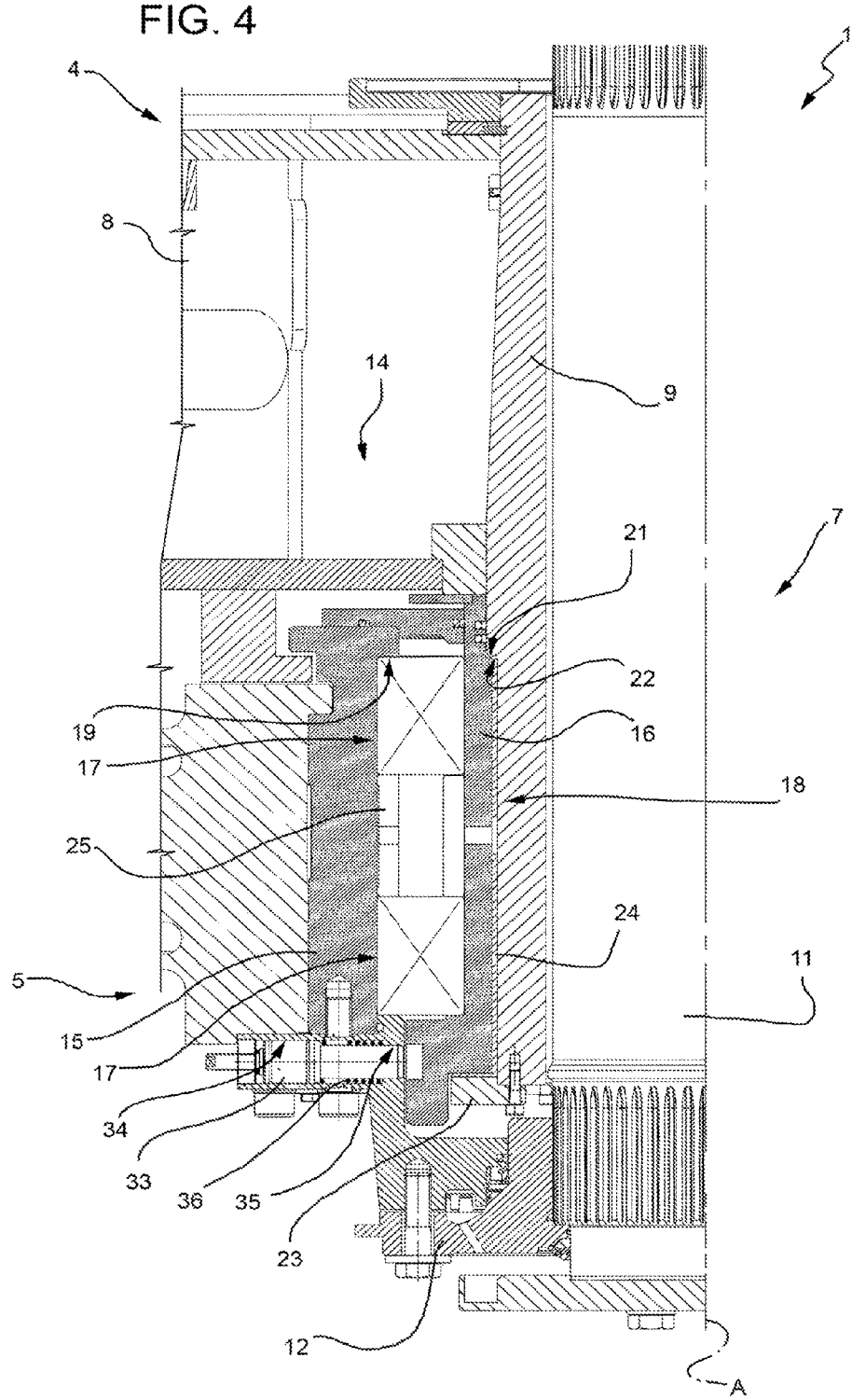
FIG. 4 shows a larger-scale section, with parts removed for clarity, of a variation of FIG. 2.

In the FIG. 4 variation, a connecting pin 33 underneath pulley 5 is substituted for connecting pin 32, and fits inside two aligned holes 34 and 35 formed in joint 12, integral with pulley 5, and in sleeve 16 respectively.

In the example shown, connecting pin 33 and hole 34 define two opposite shoulders, between which is located a spring 36 configured to prevent accidental insertion of connecting pin 33 inside hole 35.

Due to its location, dynamometer pin 26 is not visible in FIG. 4.

The FIG. 4 variation operates in the same way as described above, but has the advantage of enabling easier access to pin 33 and therefore faster intervention in the event of a malfunction of bearings 17.

The present disclosure also applies to embodiments not covered in the above detailed description, and to equivalent embodiments within the protective scope of the accompanying Claims. That is, changes may be made to the present disclosure without, however, departing from the scope of the present disclosure as defined in the accompanying Claims. It should thus be understood that various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A cable transportation system configured to operate with at least one haul cable, the cable transportation system comprising:
   an arrival/departure station including:
   a supporting structure partially defining a casing;
   a shaft configured to rotate about an axis of rotation with respect to the supporting structure;
   a pulley connected to the shaft; and
   a bearing assembly housed in the casing and including lubricating-bath bearings, said bearing assembly configured to enable the pulley and the shaft to rotate about the axis of rotation with respect to the supporting structure, said bearings including at least a first bearing and a second bearing arranged concentrically and in series, at least one of the first bearing and the second bearing configured to cause rotation of the pulley about the axis of rotation and with respect to the supporting structure.

2. The cable transportation system of claim 1, wherein the first bearing includes a rolling bearing.

3. The cable transportation system of claim 1, wherein the second bearing includes a sliding bearing.

4. The cable transportation system of claim 1, which includes at least one dynamometer pin configured to lock the rotation of the second bearing.

5. The cable transportation system of claim 4, wherein the at least one dynamometer pin is configured to break when subjected to a load above a predetermined break load.

6. The cable transportation system of claim 1, which includes at least one lock pin configured to selectively lock the first bearing.

7. The cable transportation system of claim 1, which includes at least one dynamometer pin configured to lock the rotation of the second bearing, said dynamometer pin being inserted in said casing.

8. The cable transportation system of claim 1, which includes at least one lock pin configured to selectively lock the rotation of the first bearing, said lock pin being inserted in said casing.

9. A cable transportation arrival/departure station configured to operate with at least one haul cable, the cable transportation arrival/departure station comprising:
a supporting structure with a tubular portion defining an axis of rotation;
a shaft located inside the tubular portion of the supporting structure;
a pulley extending about the axis of rotation;
a bearing assembly which is connected to the pulley and the supporting structure to enable the pulley to rotate about the axis of rotation with respect to the supporting structure, said bearing assembly including at least a first bearing and a second bearing arranged concentrically and in series, at least one of the first bearing and the second bearing configured to cause a rotation of the pulley about the axis of rotation and with respect to the supporting structure, wherein the first bearing and the second bearing are arranged in a casing partially defined by the support structure; and
a joint configured to connect the shaft to the pulley, wherein the joint forms part of said casing and a hermetic seal between the shaft and the pulley to provide a bath lubrication to the first bearing and the second bearing.

10. The cable transportation system of claim 9, wherein the first bearing includes a rolling bearing.

11. The cable transportation system of claim 9, wherein the second bearing includes a sliding bearing.

12. The cable transportation system of claim 9, which includes at least one dynamometer pin configured to lock the rotation of the second bearing.

13. The cable transportation system of claim 12, wherein the at least one dynamometer pin is configured to break when subjected to a load above a predetermined break load.

14. The cable transportation system of claim 9, which includes at least one lock pin configured to selectively lock the first bearing.

15. The cable transportation system of claim 9, which includes at least one dynamometer pin configured to lock the rotation of the second bearing, said dynamometer pin being inserted in said casing.

16. The cable transportation system of claim 9, which includes at least one lock pin configured to selectively lock the rotation of the first bearing, said lock pin being inserted in said casing.

17. The cable transportation system of claim 9, wherein the first and second bearings are lubricating-bath bearings.

18. A cable transportation system configured to operate with at least one haul cable, the cable transportation system comprising:
an arrival/departure station including:
a supporting structure;
a shaft configured to rotate about an axis of rotation with respect to the supporting structure;
a pulley connected to the shaft; and
a bearing assembly configured to enable the pulley and the shaft to rotate about the axis of rotation with respect to the supporting structure, said bearing assembly including at least a first bearing and a second bearing arranged concentrically and in series, at least one of the first bearing and the second bearing configured to cause rotation of the pulley about the axis of rotation and with respect to the supporting structure;
at least one dynamometer pin configured to lock the rotation of the second bearing and break when subjected to a load above a predetermined break load; and
at least one lock pin configured to selectively lock the first bearing.

* * * * *